United States Patent [19]
Evans

[11] 3,990,053
[45] Nov. 2, 1976

[54] STORED PROGRAM SELECTOR FOR ELECTRONIC CALCULATOR

[75] Inventor: Bob O. Evans, Greenwich, Conn.

[73] Assignee: International Business Machines Corporation, Armonk, N.Y.

[22] Filed: Oct. 15, 1973

[21] Appl. No.: 406,721

[52] U.S. Cl. .................. 340/172.5; 340/147 P; 340/365 R
[51] Int. Cl.² .......................................... G06F 9/00
[58] Field of Search ............ 340/172.5, 147 P, 365, 340/147 C, 345; 444/1; 235/152, 61.6, 61.11, 152

[56] References Cited
UNITED STATES PATENTS

| | | | |
|---|---|---|---|
| 3,248,703 | 4/1966 | Moore et al. | 340/172.5 |
| 3,511,974 | 5/1970 | An Wang | 235/61.6 |
| 3,533,076 | 10/1970 | Perkins et al. | 340/172.5 |
| 3,533,078 | 10/1970 | Perkins et al. | 340/172.5 |
| 3,593,313 | 7/1971 | Tomaszewski | 340/172.5 |
| 3,660,645 | 5/1972 | Lecht et al. | 235/152 |
| 3,686,639 | 8/1972 | Fletcher et al. | 340/172.5 |
| 3,774,164 | 11/1973 | Osterberg et al. | 340/172.5 |

Primary Examiner—Gareth D. Shaw
Assistant Examiner—John P. Vandenburg
Attorney, Agent, or Firm—J. S. Gasper

[57] ABSTRACT

A program selector in an electronic calculator has a number of formulas which are printed in human readable form. When a formula is selected by the operator a machine readable representation of the formula is positioned adjacent a transducer. The transducer generates an electrical signal which represents an identification of the particular mathematical formula or other type of program to be executed by the electronic calculator. The electrical signal is decoded by a decoder which generates a storage address for the starting point of the formula or program to be executed.

6 Claims, 5 Drawing Figures

*EXAMPLE*

$C = (a^2 + b^2)^{1/2}$ } SELECT FORMULA TO BE EXECUTED

① a 4.3 STORE
② b 5.8 STORE } ENTER OPERANDS

③ EXECUTE } INITIATE EXECUTION 7.23 } DISPLAY RESULT

STORED PROGRAM SELECTOR FOR ELECTRONIC CALCULATOR

BACKGROUND OF THE INVENTION

The present invention relates to selector mechanisms and more particularly to a selector mechanism for program selection in an electronic calculator.

DESCRIPTION OF THE PRIOR ART

In recent years there have been many developments and improvements in electronic calculators. Among these developments has been the so-called hand held or pocket calculator which has the ability to execute a number of arithmetic functions such as add, subtract, multiply and divide.

In addition to the four function calculator, more sophisticated scientific calculators have been developed which include a number of scientific mathematical functions in addition to the arithmetic functions of add, subtract, multiply and divide. These scientific calculators generally have a keyboard which has a key for each of the numerical digits, a key for decimal point, and a key for each of the arithmetic and scientific mathematical functions which are capable of execution by the calculator.

A most recent development in electronic calculators of the type mentioned above is the addition on the keyboard of a special key to change the functions indicated by each of the mathematical function keys on the keyboard to a second set of functions thereby doubling the number of mathematical functions which are executable by the calculator.

However, the prior art electronic calculators such as described above require multiple operator key manipulations to enter a complete formula with numerical data as well as a separate storage such as the human operator's memory or a tablet of some kind to store the mathematical formula which the operator wishes to execute. Further, if the operator is not completely familiar with the formula which he wishes to execute, he must look up the formula from a table or the like prior to execution.

SUMMARY OF THE INVENTION

Therefore, it is a primary object of the present invention to reduce errors and facilitate the operation of an electronic calculator having a number of program routines stored in a storage unit, by manually selecting one of a group of human readable representations of the stored programs.

Another object of the present invention is to reduce errors and facilitate operation of an electronic calculator having a number of program routines stored in a storage unit, by manually selecting one of a group of human readable representations of the stored programs, there being a machine readable representation corresponding to each human readable representation for each stored program so that an electrical signal is generated in response to the machine readable representation to access the selected stored program for execution.

It is another object of the present invention to reduce errors and facilitate operation of an electronic calculator by apparatus including a positionable display element containing a number of human readable representations of stored programs and a corresponding machine readable representation for each human readable representation; a transducer responsive to each of the machine readable representations for generating an electrical signal representative of one of the stored programs; and a decoder for generating a program start address in response to the electric signal.

It is a further object of the present invention to reduce errors and facilitate operation of a scientific electronic calculator by apparatus including a positionable formula display element for allowing operator selection of one of a number of human readable representations of stored mathematical formula programs, there being a corresponding machine readable representation for each human readable representation, a transducer responsive to each of the machine readable representations for generating an electric signal representative of one of the stored mathematical formula programs, and a decoder for generating a program start address in response to the electric signal, wherein the positionable display element has at least one position reserved for manual entry of program functions.

Apparatus embodying the present invention includes a positionable display element which carries a number of human readable representations of programs executable by an electronic calculator, with a machine readable representation corresponding to each of the human readable representations, a means for manually selecting one of the human readable representations representing a program to be executed, a transducer responsive to the machine readable representations for generating a start address of a location in a storage unit of the electronic calculator representing the beginning of the selected program.

It is a feature of the present invention that the positionable display element and corresponding program storage unit may be removed from the calculator and replaced with a different positionable display element and a different storage unit having additional program representations and instruction sequences stored therein respectively. The use of interchangeable program storage elements and positionable display elements allows the operator a choice of executable programs which is limited only by the storage capacity of the electronic calculator.

It is another feature of the present invention that the entire structure may be included in a small hand held electronic calculator.

The foregoing and other objects, features and advantages of the invention will be apparent from the following more particular description of the preferred embodiment of the invention as illustrated in the accompanying drawing.

DESCRIPTION OF THE PREFERRED EMBODIMENTS

Figure 1:
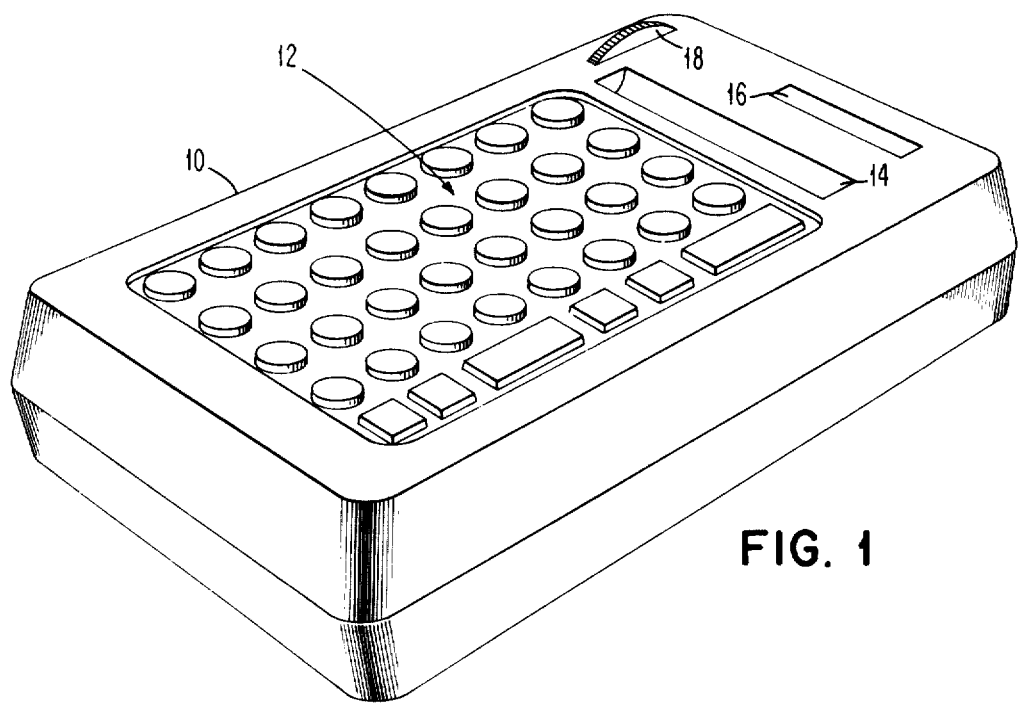
FIG. 1 is an isometric drawing of an electronic calculator embodying the present invention.
Figure 3:
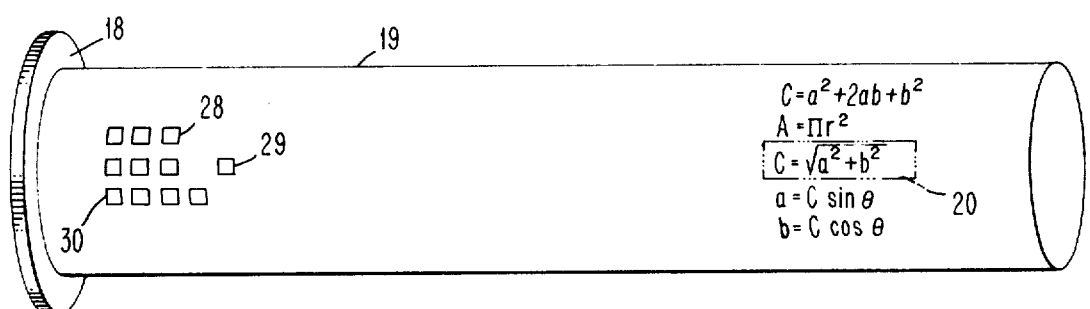
FIG. 3 is a view of one embodiment of a display element employed with the present invention.

FIG. 1 shows an electronic calculator 10 embodying the present invention. In addition to a multi-function keyboard 12 and a result display 14, the electronic calculator embodying the present invention further includes a display window 16 for viewing human readable representations of a program to be executed and a means 18 for selecting a program to be executed which may be embodied as a knurled thumb wheel which may be easily operated by the finger pressure of the operator. FIG. 3 shows in greater detail a positionable display element 19 in the form of rotatable cylinder having knurled wheel 18 connected thereto. Located on the surface of cylinder 19 at a position to be viewable through display window 16 are a plurality of printed indicia such as formula 20 which are the human readable representation of the program or mathematical formula to be executed. Also formed on cylinder 19 are groups of transparent regions or other coded marking means aligned with the printed indicia programs or formulas to form machine readable representations 28, 29, and 30 corresponding to the respective human readable representations of programs to be executed.

Figure 2:
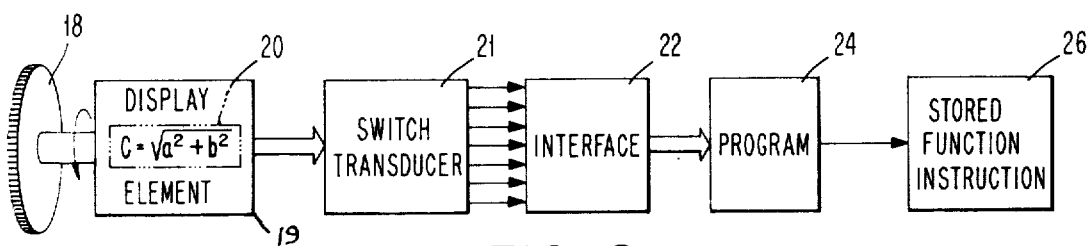
FIG. 2 is a functional block diagram of the interaction between elements of the invention and the electronic calculator.

Referring now to FIG. 2, the individual functions of apparatus embodying the present invention are shown. Selecting means 18 is coupled to display element cylinder 19 to select a particular program or mathematical formula to be executed. In the example shown in FIGS. 2, 3, and 5, the formula $C = (a^2 + b^2)^{1/2}$ is used. Coupled to the display element cylinder 19, is a transducer 21 which senses the machine readable representations such as representations 28, 29, and 30 shown in FIG. 3 each of which represents one of the mathematical formulas or programs which may be operator selected. Transducer 21 provides a signal which is converted by interface 22 to a start address for the program 24 selected. A series of instructions 26 is read from the storage in sequence so that the program selected may be executed in sequence by the electronic calculator.

Figures 4, 5:
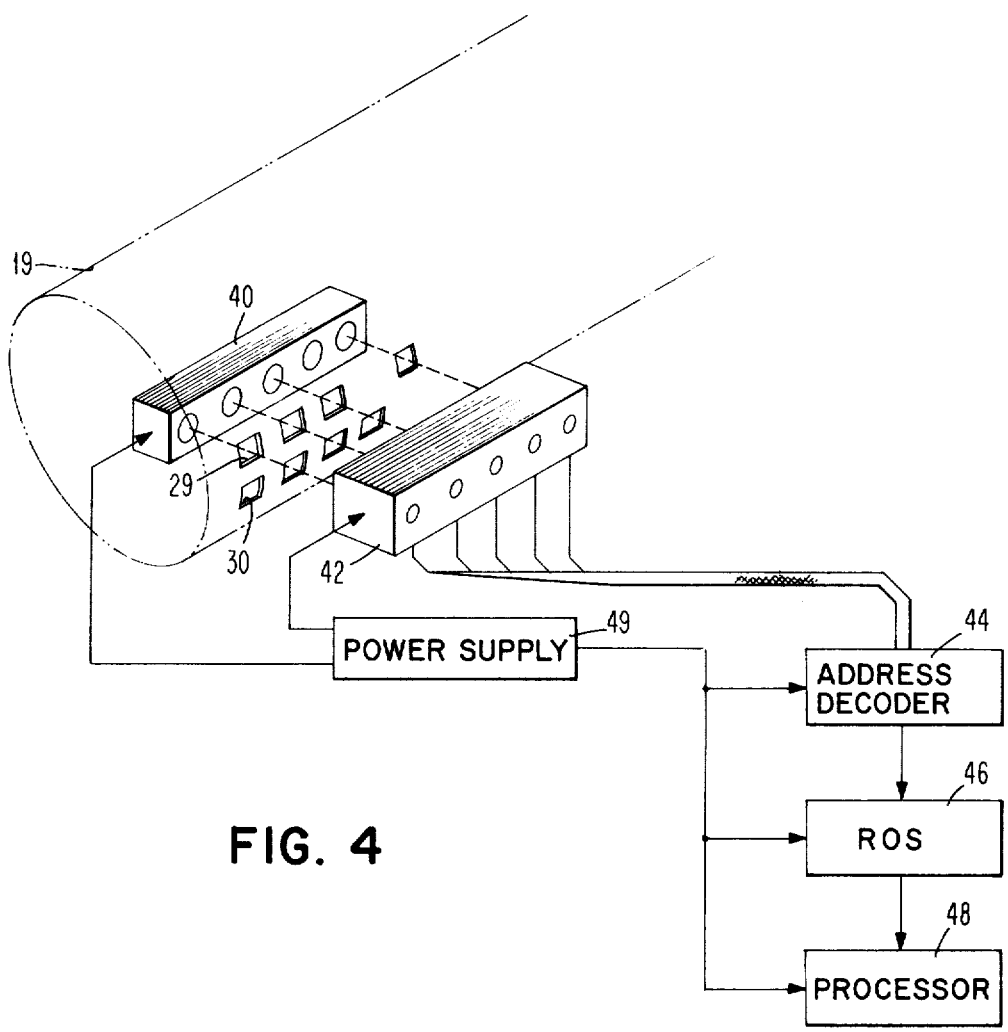
FIG. 4 is a combined isometric and schematic block diagram of the electronic circuitry according to a preferred embodiment of the present invention.
FIG. 5 exhibits the steps in the operation of an electronic calculator embodying the present invention.

Referring now to FIG. 4, structure of a transducer which may be employed in a preferred embodiment of the present invention is shown. A light source 40 which may be a block of light emitting diodes in an integrated package, is mounted within the cylinder 19 of the positionable display element in alignment with the machine readable representations such as 29. When activated by power supply 49, each of the light emitting diodes contained in light source 40 emit radiant energy which is selectively passed or blocked by the presence or absence of transparent regions in positionable display element 19 and detected by a group of radiant energy sensitive detectors which are packaged in detector unit 42. Each of the radiant energy sensitive detectors in detecting unit 42 may be light sensitive transistors or the like. In the embodiment shown in FIG. 4, a 5-bit binary control word is generated as the output of detector 42. This 5-bit control word which represents the program or mathematical formula selected to be executed by the electronic calculator is then decoded by address decoder 44 which generates an address for a read only storage 46 of the first instruction in the program to be executed. Read only storage 46 transmits the instruction to be executed to the processor 48 which represents the logic, control and data flow of the electronic calculator including instruction registers, data registers, random access memory, counters, etc.

Power supply 49 supplies power to the electronic logical elements as well as light source 40 and detector 42. In a preferred embodiment of the invention, power supply 49 may be one or more small batteries.

No attempt has been or will be made to describe in detail the operation or structure of an electronic calcuator which may be used with the present invention. The present invention is directed to the selection of a stored program. The execution of the program once the initial address has been generated is left to the electronic calculator. Electronic calculators are presently available in the prior art which are capable of executing the program routines once selected by the present invention.

For further description of a self-controlled microprogram system, applicant incorporates by reference U.S. Pat. No. 3,400,371 to Amdahl, et al.

Referring now to FIG. 5, an example of the operation of the present invention along with the sample function mentioned above is shown. The formula for the program to be executed is manually selected, for example, $$C + (a^2 = b^2)^{1/2}.$$

Next, the two required operands are entered. For example the key strokes might be:

a, 4.3, STORE. And:
b, 5.8, STORE.

Since the formula appearing at display element 20 indicates that a and b are the only operands to be entered, the formula is now ready for execution. The operator presses the execute key which causes the program instructions for calculating the quantity $(4.3^2 + 5.8^2)$ to the ½ power to be executed in sequence.

An example of the instructions which might be executed in response to the formula selected in this example is as follows:

1. Multiply $a \times a$, (or square a), store in $x$;
2. Multiply $b \times b$, (or square $b$), store in $y$;
3. Add the contents of $x$ to the contents of $y$, store in $x$;
4. Take square root of $x$, store in $c$;
5. Display contents of $c$ in output indicators.

If desired, one formula representation on positionable display element cylinder 19 might be left blank or indicated as an operator entered program with a machine readable representation perhaps inhibiting access of the read only storage 46 and causing an alternative program routine to be executed in response to operator entered functions as well as operands.

Since the invention leads itself to expansion of the programs which may be executed by replacement of the read only storage element as well as the positionable display element, one position on each display element cylinder 19 would have to be reserved for operator entered programs.

While the invention has been shown and described with reference to a particular embodiment thereof, it will be understood by those skilled in the art that various changes in form and detail may be made without departing from the spirit and scope of the invention.

What is claimed is:

1. In an electronic calculator, apparatus for selecting one of a plurality of stored programs for execution, comprising:
   a rotatable program selector device such as a drum;
   said program selector device having a display portion containing a plurality of human readable representations, each representing one of said plurality of stored programs, said program selector device having a control portion containing machine readable representations corresponding to each of said human readable representations;

said machine readable representations being positionable concurrently with the display of corresponding human readable representations upon rotation of said selector device;

manual means for rotating said program selector device to enable human viewing and selection of said human readable representations in said display portion of said selector device; and transducer means operable for generating a program start signal in response to a machine readable representation in said control portion of said program selector device corresponding to a manually selected human readable representation of a desired program.

2. Apparatus according to claim 1 wherein said human readable representations contained in said display portion of said rotatable program selector devices comprises:

a plurality of mathematical formulae and wherein each of the mathematical formulae has a corresponding digitally coded representation in said control portion of said selector device.

3. Apparatus according to claim 1 wherein said transducer means further comprises:

means for sensing said machine readable representations; and means for decoding connected to said means for sensing for generating a program start signal.

4. Apparatus according to claim 1 wherein said display means has one or more manually selectable positions reserved for operator entered programs.

5. Apparatus according to claim 1 wherein said program selector device and a corresponding storage unit comprise a replaceable set to extend the number of programs which may be selected for execution by said electronic calculator.

6. Apparatus in accordance with claim 3 in which said program start signal comprises a start address of a stored program to be executed.

* * * * *